United States Patent [19]
Winters

[11] 3,823,959
[45] July 16, 1974

[54] TWO WHEEL DRIVE BICYCLE
[76] Inventor: R. F. Winters, P.O. Box 123 Rouse Station, Covington, Ky. 41014
[22] Filed: Dec. 29, 1971
[21] Appl. No.: 213,689

[52] U.S. Cl.................. 280/234, 280/240, 280/250
[51] Int. Cl............................................. B62m 1/00
[58] Field of Search.................... 280/240, 234, 250

[56] References Cited
UNITED STATES PATENTS

| | | | |
|---|---|---|---|
| 564,099 | 7/1896 | Pritchett | 280/250 |
| 565,556 | 8/1896 | Murray | 280/234 |
| 595,501 | 12/1897 | Stoops | 280/234 |
| 597,348 | 1/1898 | Winters | 280/240 |
| 3,193,305 | 7/1965 | Hendricks | 280/250 |
| 3,485,508 | 12/1969 | Hudnall | 280/234 |

Primary Examiner—Robert J. Spar
Assistant Examiner—John Mannix

[57] ABSTRACT

A bicycle which includes a frame supported at its rear on a rear wheel, the front of the frame being supported on a steering post supported on a front wheel; the rear wheel being powered or braked by a foot pedal unit, and the front wheel being powered or braked by a hand pedal unit mounted on the steering post.

1 Claim, 2 Drawing Figures

PATENTED JUL 16 1974

3,823,959

TWO WHEEL DRIVE BICYCLE

This invention relates generally to bicycles.

A principal object of the present invention is to provide a health building machine while having all the advantages of a standard bicycle.

Another object is to provide a bicycle wherein a rear wheel is powered or braked by a foot pedal unit, and wherein a front wheel is powered or braked by a hand pedal unit, so that both hands and both feet are activated.

Yet another object is to provide a two wheel drive bicycle wherein all the muscles of a person's body are exercised; the muscles of the hands, arms, shoulders, and the vital muscles of the chest, back abdomen are utilized, developed and strengthened; while all internal muscles and internal organs are exercised and strengthened.

By action of the muscles mentioned, and the internal organs (1) Peristaltic action is increased, (2) Respiration is increased, with resultant development of the vital lungs, (3) Circulation is increased, poisons are thrown off, and constitutional benefit is obtained, (4) Metabolism is increased, (5) Muscle tone is restored to the vital upper part of the body, and (6) Glandular Action is increased. All this results in betterment of health, and a restoration of vigor and vitality, resulting in a longer, more enjoyable life.

Physical fitness can be restored, all bodily functions benefitted, and a feeling of well-being attained. The vital exercise obtained by use of the hands to propel the front wheel is such that it cannot be duplicated in any known way. The vital exercise obtained in this manner is not the boring, uninteresting type of exercise that one has to force one to perform. It is a pleasure to perform! The exercise can actually be said to be incidental to the normal enjoyment of bicycle riding.

During long-distance or marathon bicycle riding, much time can be saved due to alternating between the feet and the hands in propelling the bicycle, thus resting one part of the body, while propelling the bicycle with the other part. In hilly territory, much more time can be saved by using propelling force on both wheels on grades when ordinarily the rider would have to walk and push the bicycle up the grade.

Athletes, and others whose muscles had been built up and properly strengthened, could obtain more advanced exercise by holding the bicycle back by applying braking force on the rear wheel while propelling the bicycle by applying motive power to the front wheel. Likewise, the braking force can be used on the front wheel while applying motive power to the rear wheel. The only limit to such exercise would be the endurance of the rider.

Yet another object is to provide a two wheel drive bicycle wherein the hand pedal unit does not in any way interfere with the conventional steering handles of the bicycle.

Other objects are to provide a two wheel drive bicycle which is simple in design, inexpensive to manufacture, rugged in construction, easy to use, and efficient in operation.

These and other objects will be readily apparent upon a study of the following specification and the accompanying drawing, wherein.

Figures 1, 2:
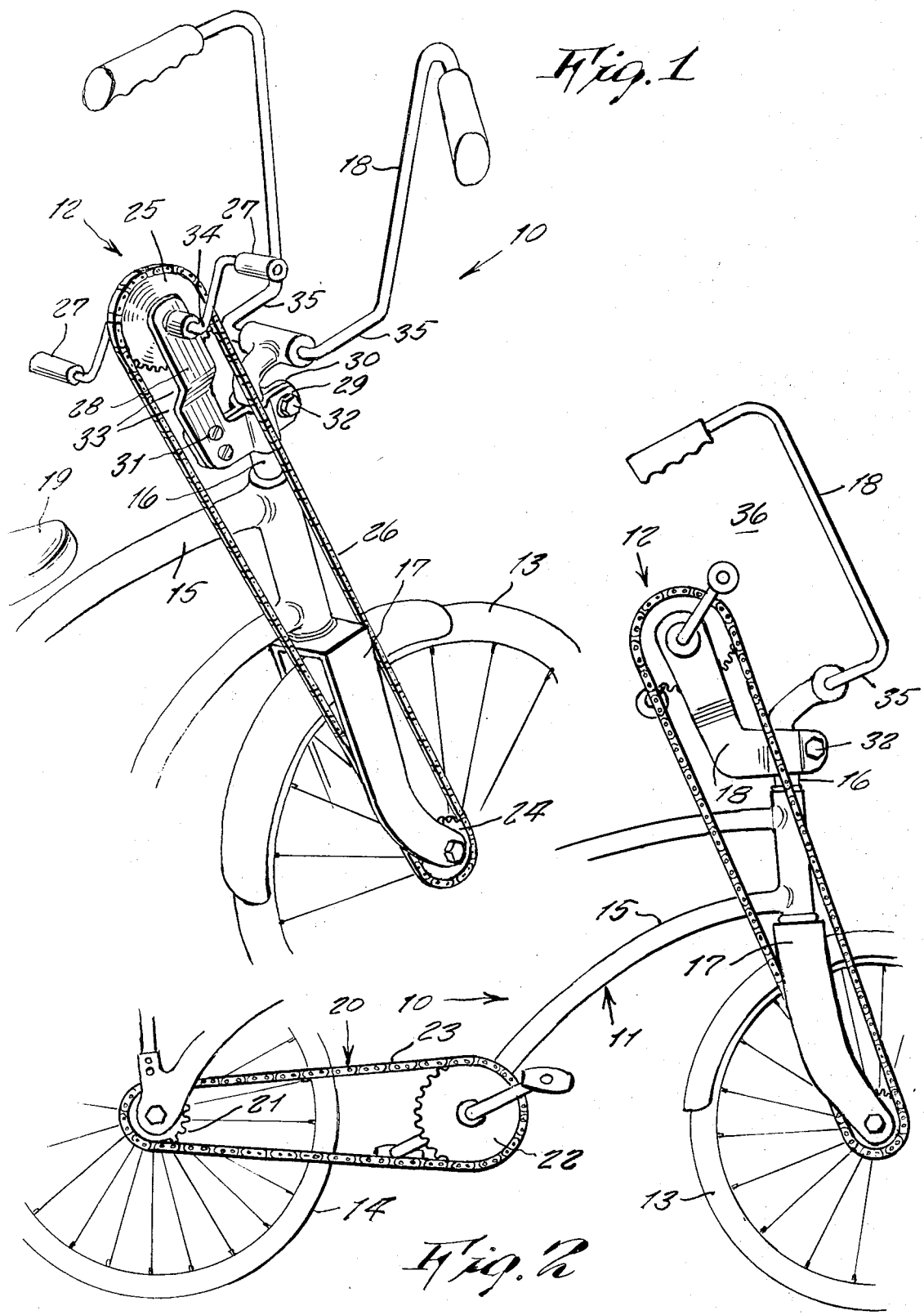
FIG. 1 is a perspective view of the hand pedal unit.
FIG. 2 is a side view of a bicycle incorporating the present invention.

Referring now to the drawing in detail, the reference numeral 10 represents a two wheel drive bicycle according to the present invention wherein there is a conventional bicycle 11 that includes a hand pedal unit 12.

The bicycle 11 includes a front wheel 13, rear wheel 14, a frame 15 supported at the rear on the rear wheel and supported at its front pivotally free on a steering post 16 that is at the upper end of a fork 17 supported on the front wheel.

The steering post carries steering handle 18. The frame carries a seat 19. The bicycle 11 also includes a foot pedal unit 20 for powering or braking the rear wheel 14; the unit 20 including rear wheel sprocket 21 and foot pedal sprocket 22 fitted with endless chain 23; the sprocket 21 having foot pedals.

The hand pedal unit 12 includes a front wheel coaster brake and sprocket 24 for powering or braking the front wheel 13, a hand pedal sprocket 25, and endless chain 26 therebetween; the sprocket 25 having hand pedals 27.

The hand pedal unit 12 also incorporates a bracket 28 which at one end forms a clamping jaw 29 for association with a clamping jaw 30 so to clamp around the steering post 16. The jaws 29 and 30 are secured together by screws 31 and bolt 32 so to lock hard around the steering post so that the bracket pivots together with the steering post when the bicycle is turned during steering.

It is to be noted that the bracket 28 extends upwardly so that the hand pedal sprocket 25 is located in an area where there is a sufficient clearance for turning the hand pedals 27, without danger of a bicyclist's hands bumping against the steering post or steering handle 18 while having his hands on the hand pedals 27.

The bracket 28 also includes an offset double bend 33 so that the sprocket 25 is displaced sidewardly, so that the endless chain 26 is located along one side of the frame 15 so to clear it and so that the endless chain is aligned with sprocket 24 positioned on one side of the wheel 13. In view that the double bend 33 thus displaces the sprocket 25 toward one side, it may be advisable that the hand pedal crank shaft 34 extends a greater distance on the opposite side so that the hand pedals are spaced equally sidewardly from the longitudinal central axis of the bicycle. Thus the bicyclist centrally balanced upon the bicycle reaches a same distance for the hand pedals 27.

The bracket 28 may be made adjustable in position so to accommodate each cyclist individually for best fit. As shown, the steering handle 18 may include foreward extending portions 35 so to clear the hand pedal open area 36.

By applying power to the hand pedals, the front wheel is driven. The bicycle can be propelled exclusively in this manner; or it can be propelled by the use of the feet on the conventional pedals which cause the bicycle to be propelled by the turning of the rear wheel; or force can be applied to both wheels simultaneously by use of the feet on the rear pedals and the hands on the front pedals. This dual operation can be used to advantage when ascending a grade. The brake on both wheels can be used when descending a grade, thus reducing wear and insuring safety under any grade condition.

While various changes may be made in the detail construction, it is understood that such changes will be within the spirit and scope of the present invention as is defined by the appended claims.

I claim:

1. In a two wheel drive bicycle the combination of a front and rear wheel, a frame supported at its rear on said rear wheel, a front of said frame supported pivotally free on a steering post upon a fork supported on said front wheel, handle bars on said steering post, a seat on said frame, a foot pedal unit mounted on said frame to power and brake said rear wheel, and a hand pedal unit for powering and braking said front wheel, said hand pedal unit comprising a mounting bracket fitted on said steering post supporting a rotatable hand pedal sprocket fitted with hand pedals, a coaster brake and sprocket fitted on a hub of said front wheel, and an endless chain interconnecting said sprockets, a transverse axis of said hand pedal sprocket being rearwardly of a generally vertical axis of said steering post, said hand pedal sprocket being located to one side of a longitudinal central axis of said bicycle so that said chain clears said frame and is aligned with said wheel sprocket, horizontal and vertical adjustment means being provided for ideal location of said hand pedal sprocket, said hand pedals being located equally spaced sidewardly from said longitudinal axis of said bicycle, and said hand sprocket being in an open area so that said hand pedals clear said steering post and steering handle bars, said handle bars each accordingly being of a generally U-shape when viewed from a side so to form said open area.

* * * * *